(12) United States Patent
Tsai et al.

(10) Patent No.: US 8,811,541 B2
(45) Date of Patent: Aug. 19, 2014

(54) RECEIVER, SIGNAL DEMODULATION MODULE AND DEMODULATION METHOD THEREOF

(71) Applicant: National Taiwan University, Taipei (TW)

(72) Inventors: Yi-Lin Tsai, Nantou County (TW);
Jian-You Chen, New Taipei (TW);
Bang-Cyuan Wang, Kaohsiung (TW);
Tsung-Hsien Lin, Taoyuan County (TW)

(73) Assignee: National Taiwan University, Taipei (TW)

( * ) Notice: Subject to any disclaimer, the term of this patent is extended or adjusted under 35 U.S.C. 154(b) by 23 days.

(21) Appl. No.: 13/794,699

(22) Filed: Mar. 11, 2013

(65) Prior Publication Data

US 2014/0161211 A1    Jun. 12, 2014

(30) Foreign Application Priority Data

Dec. 10, 2012  (TW) ............................. 101146364 A

(51) Int. Cl.
*H03D 3/00* (2006.01)
*H04L 27/227* (2006.01)

(52) U.S. Cl.
CPC .................................. *H04L 27/2272* (2013.01)
USPC ............................................................ 375/330

(58) Field of Classification Search
USPC .................................. 375/329, 330, 279, 283
See application file for complete search history.

(56) References Cited

U.S. PATENT DOCUMENTS

2014/0019828 A1 *   1/2014  Mihai Ionescu et al. ...... 714/776

* cited by examiner

*Primary Examiner* — Kevin Kim
(74) *Attorney, Agent, or Firm* — Li & Cai Intellectual Property (USA) Office

(57) ABSTRACT

A signal demodulation module is disclosed. The signal demodulation module includes an injection-locked oscillator, an envelope detector and a data slicer. The injection-locked oscillator has a central oscillating frequency equal to a frequency of a digital modulation signal received, and outputs a phase-locked oscillating signal which is in phase to the digital modulation signal. When input phase of the digital modulation signal changes, output phase of the injection-locked oscillator changes synchronously. The envelope detector is used for detecting an envelope line of the phase-locked oscillating signal and outputting an envelope signal accordingly. The data slicer is used for receiving the envelop signal and outputting a first digital signal according to a reference voltage and the envelop signal.

19 Claims, 6 Drawing Sheets

RECEIVER, SIGNAL DEMODULATION MODULE AND DEMODULATION METHOD THEREOF

BACKGROUND OF THE DISCLOSURE

1. Field of the Disclosure

The instant disclosure relates to a receiver; in particular, to a signal demodulation module for a receiver.

2. Description of Related Art

As people should know, communication includes wire/wireless communication supported by wire/wireless communication equipment. Communication systems include domestic/international cellular telecommunication system, Internet, and point-to-point indoor wireless network. Each type of the communication systems is constructed and operated according to one or a plurality of communication standard. For example, wireless communication may be operated according to one or a plurality of standard such as Institute of Electrical and Electronics Engineers (IEEE) 802.11, Bluetooth, Advanced Mobile Phone System (AMPS), digital AMPS, Global System for Mobile Communications (GSM), Code Division Multiple Access (CDMA), local multi-point distribution systems (LMDS), multi-channel-multi-point distribution system (MMDS), and/or a variation version from any of the above, and it is not limited thereto.

According to a type of a wireless communication system, the wireless communication equipment directly or indirectly communicates with another wireless communication equipment. The wireless communication equipment may be: a cellular phone, a bidirectional radio transceiver, a personal digital assistant (PDA), a personal computer (PC), a laptop, a home entertainment device. As for the direct communication (also known as point-to-point communication), the wireless communication equipment which are involved in a communication modulate their receivers and transmitters on the same channel/channels, and communicate through the channel/channels. Each of the channels may be set according to one or more than one carriers from a plurality of the radio frequency carriers of the wireless communication system. As for the indirect wireless communication, each of the wireless communication equipment via a distributed channel to directly communicate with related base (such as a cellular operation system) and/or related base station (such as indoor or building wireless network). To complete a communicating connection between the wireless communication equipment, the related base and/or base station communicate with each other via a system controller, a public switched telephone network, Internet, and/or other wide area network.

To be involved in the wireless communication, each of the wireless communication equipment includes a wireless transceiver built inside (the wireless transceiver includes a receiver and a transmitter), or is coupled to a related wireless transceiver (such as an indoor work station and/or a building wireless communication network, a radio frequency modem). A regular transmitter follows a wireless communication standard of a generated base-band signal to modulate data, and transform the data into a radio frequency signal. The base-band signal is frequency-mixed in one or a plurality of IF stage and a local oscillator to generate the radio frequency signal. Regularly, a receiver includes an antenna, a filter, a low noise amplifier, an IF stage, and a demodulator. The antenna receives a radio frequency signal and provides to the filter, and the filter transmits the radio frequency signal filtered to the low noise amplifier. The low noise amplifier amplifies the radio frequency signal filtered and provides to the IF stage. The IF stage converts (reduces) the radio frequency signal amplified into a medium frequency or base-band signal. The IF stage provides an IF signal or a base-band signal to the demodulator, and the demodulator reacquires the data according to a modulation protocol.

In wireless communication, there are particular requirements for specifications regarding a carrier band width of different frequency bands, a size of a signal channel, and a data transferring rate. In comparison to a specification of a receiver for the mobile phone, design requirements of the specification of a receiver used in biomedical electronic fields are relatively lenient. However, it is quite strict when it comes to power efficiency, and with an application method of implantation, there is limited power source from the outside. Therefore, it is a current issue in how to maintain an overall low power efficiency and high energy efficiency, and to keep a specific transmission distance and amount of data needed.

In prior arts, the receiver demodulates mainly with two oscillators, and a center frequency of the two oscillators must be respectively higher and lower than a frequency of a signal injected, and thus a great input power is required for a regular operation. Furthermore, it is able to demodulate Binary Phase Shift Keying (BPSK) with the method in prior arts that is to demodulate with the two injection-locked oscillators; however, there is no absolute reference phase in the demodulation mechanism, and thus it is possible to cause a series of mistakes when a mistake happens, and thus leads to a high Bit Error Rate (BER).

SUMMARY OF THE DISCLOSURE

The instant disclosure provides a signal demodulation module, and the signal demodulation module includes an injection-locked oscillator, an envelope detector and a data slicer. The injection-locked oscillator has a central oscillating frequency, and the injection-locked oscillator receives a digital modulation signal and outputs a phase-locked oscillating signal which is in phase to the digital modulation signal, and when an input phase of the digital modulation signal changes, an output phase of the injection-locked oscillator changes synchronously, wherein the central oscillating frequency is equal to a frequency of a digital modulation signal, and when the output phase of the injection-locked oscillator changes, an amplitude of the phase-locked oscillating signal will temporarily be relatively small compared to the amplitude of the phase-locked oscillating signal in a pre-state. The envelope detector is connected to the injection-locked oscillator, and the envelope detector is detects an envelope line of the phase-locked oscillating signal and accordingly outputs an envelope signal which is analogic. The data slicer is connected to the envelope detector, and the data slicer has a reference voltage and receives the envelop signal, and the data slicer outputs a first digital signal according to the reference voltage and the envelop signal.

In an embodiment of the instant disclosure, the digital modulation signal is a differential phase shift keying modulation signal, and a time interval of the first digital signal of a low level voltage corresponds to a time interval of a synchronous change between the input phase of the digital modulation signal and the output phase of the phase-locked oscillating signal.

In an embodiment of the instant disclosure, when the input phase of the digital modulation signal is reversed for 180 degrees, the output phase of the phase-locked oscillating signal is reversed for 180 degrees as well.

In an embodiment of the instant disclosure, the signal demodulation module further includes a D-type flip-flop. The D-type flip-flop is connected to the data slicer, and a data input end of the D-type flip-flop receives the first digital signal, and a clock input end of the D-type flip-flop receives a clock signal, and a data output end of the D-type flip-flop outputs a recovery digital signal, wherein the D-type flip-flop samples the first digital signal with a rising edge of the clock signal.

In an embodiment of the instant disclosure, the signal demodulation module further includes a one-shot circuit and a D-type flip-flop. The one-shot circuit is connected to a data slicer, and the one-shot circuit unifies the range of the time interval of every bit of a first digital signal time interval, and outputs an adjusted first digital signal. The D-type flip-flop is connected to the data slicer, and a data input end of the D-type flip-flop receives an adjusted first digital signal, and a clock input end of the D-type flip-flop receives a clock signal, and a data output end of the D-type flip-flop outputs a recovery digital signal, wherein the D-type flip-flop samples the first digital signal with a rising edge of the clock signal.

In an embodiment of the instant disclosure, the signal demodulation module further includes a gain adjusting controller. The gain adjusting controller receives a first digital signal and an adjusted first digital signal and accordingly outputs a gain adjusting control signal.

In an embodiment of the instant disclosure, a gain adjusting controller includes a first switch, a second switch, and a storing capacitor. A terminal of the first switch is connected to a terminal of a first current source, wherein the first switch receives the first digital signal and accordingly determines the first switch to be switched on or off. A terminal of the second switch is connected to another terminal of the first switch, and another terminal of the second switch is connected to a terminal of the second current source, wherein the second switch receives the adjusted first digital signal and accordingly determines the second switch to be switched on or off. A terminal of the storing capacitor is connected between the first switch and the second switch and outputs a gain adjusting control signal, and another terminal of the storing capacitor is connected to the ground voltage, wherein the gain adjusting control signal is a capacitor voltage of the storing capacitor.

In an embodiment of the instant disclosure, when the first switch is switched on and the second switch is cut off, the first current source generates a charging current and proceeds charging to the storing capacitor through the first switch; when the first switch is cut off and the second switch is switched on, the second current source generates a discharging current and the discharging current flows from the storing capacitor to the second switch to allow the storing capacitor to proceed discharging; when the first switch is switched on while the second switch is cut off or shut down, the capacitor voltage of the storing capacitor stays the same.

In an embodiment of the instant disclosure, the signal demodulation module further includes a gain adjusting controller, an antenna, a low noise amplifier. The antenna receives a high frequency carrier signal, wherein the high frequency carrier signal includes a data of a recovery digital signal. The low noise amplifier is connected to the antenna, and the low noise amplifier receives the high frequency carrier signal transmitted by the antenna, processes the high frequency carrier signal, and outputs a low-noise high frequency carrier signal. The voltage-controlled gain amplifier is connected to the low noise amplifier, and the voltage-controlled gain amplifier receives the low-noise high frequency carrier signal and a gain adjusting control signal, and the voltage-controlled gain amplifier adjusts an amplitude of the low-noise high frequency carrier signal according to the gain adjusting control signal and outputs a digital modulation signal An embodiment of the instant disclosure further provides a signal demodulation method for a signal demodulation module, and the signal demodulation module includes an injection-locked oscillator, an envelope detector and a data slicer, wherein the injection-locked oscillator has a central oscillating frequency, and the signal demodulation method includes: receiving a digital modulation signal; outputting a phase-locked oscillating signal which is in-phase to the digital modulation signal in-phase, wherein when an input phase of the digital modulation signal changes, an output phase of the phase-locked oscillating signal synchronously change into a new phase; detecting an envelope line of the phase-locked oscillating signal and accordingly outputs an envelope signal which is analogic; receiving the envelope signal, and outputting a first digital signal according to the envelope signal and a reference voltage. Among the above, the central oscillating frequency is equal to a frequency of the digital modulation signal, and when the output phase of the injection-locked oscillator changes, an amplitude of the phase-locked oscillating signal will temporarily be relatively small compared to the amplitude of the phase-locked oscillating signal in a pre-state.

An embodiment of the instant disclosure further provides a receiver, and the receiver includes a signal demodulation module and a load. The signal demodulation module demodulates the digital modulation signal and outputs a recovery digital signal. The load receives the recovery digital signal to proceed a normal work.

To sum up, the embodiments of the instant disclosure provide the signal demodulation module which is able to prevent a pulling effect between two oscillators in the prior arts, and thus the sensibility and energy efficiency of the receiver are raised. Furthermore, the embodiments of the instant disclosure demodulates through transforming the phase change of the modulation signal into an amplitude change to greatly simplify a circuit design and reduce a circuit designing cost.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

The description recited below refers to accompanying drawings for a specific instruction of embodiments of the instant disclosure, and thereby the instant disclosure is further understood, and in the accompanying drawings.

DETAILED DESCRIPTION OF PREFERRED EMBODIMENTS

Figure 1:
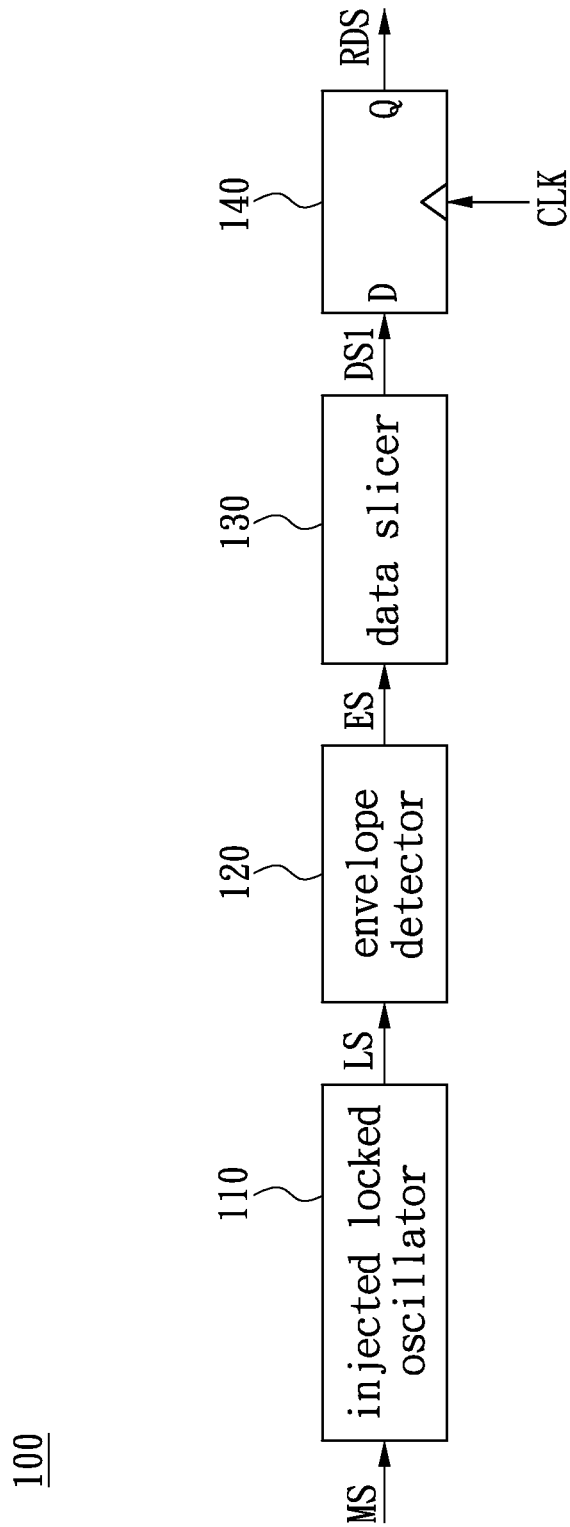
FIG. 1 shows a block diagram of a signal demodulation module according to an embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

[Embodiment of a Signal Demodulation Module]

Referring to FIG. 1, FIG. 1 shows a block diagram of a signal demodulation module 100 according to an embodiment of the instant disclosure. As shown in FIG. 1, in the present embodiment, the signal demodulation module 100 includes an injection-locked oscillator 110, an envelope detector 120, a data slicer 130, and a D-type flip-flop 140. The envelope detector 120 is connected to the injection-locked oscillator 110. The data slicer 130 is connected to the envelope detector 120. The D-type flip-flop 140 is connected to the data slicer 130.

Regarding the injection-locked oscillator 110, the injection-locked oscillator 110, as a local oscillator, is a digital oscillator and has a central oscillating frequency. In the present embodiment, the injection-locked oscillator 110 is for receiving a digital modulation signal MS, and the injection-locked oscillator 110 outputs a phase-locked oscillating signal LS which is in-phase to the digital modulation signal MS. When an input phase of the digital modulation signal MS changes, an output phase of the injection-locked oscillator LS changes synchronously to correspond to the digital modulation signal MS. Furthermore, when the output phase of the injection-locked oscillator 110 changes, an amplitude of the phase-locked oscillating signal LS will temporarily be relatively small compared to the amplitude of the phase-locked oscillating signal LS in a pre-state. It is worth mentioning that the central oscillating frequency of the injection-locked oscillator 110 is equal to a frequency of the digital modulation signal MS. Moreover, in the present embodiment, the digital modulation signal MS is a modulated signal of differential phase shift keying (DPSK).

Regarding the envelope detector 120, the envelope detector 120 receives the phase-locked oscillating signal LS transmitted by the injection-locked oscillator 110, and the envelope detector 120 is for detecting an envelope line of the phase-locked oscillating signal LS and accordingly outputting an envelope signal ES.

Regarding the data slicer 130, the data slicer 130 has a reference voltage and receives the envelope signal ES, and the data slicer 130 outputs a first digital signal DS1 according to the reference voltage and the envelope signal ES, wherein the reference voltage is acquired through the amplitude of the envelope signal ES by the data slicer 130. It is worth mentioning that, in the present embodiment, a time interval of the first digital signal DS1 of a low level voltage corresponds to a time interval of a synchronous change between the input phase of the digital modulation signal MS and the output phase of the phase-locked oscillating signal LS.

Regarding the D-type flip-flop 140, a data input end of the D-type flip-flop 140 receives the first digital signal DS1, and a clock input end of the D-type flip-flop 140 receives a clock signal CLK, and a data output end of the D-type flip-flop 140 outputs a recovery digital signal RDS, wherein the recovery digital signal RDS is substantially equal to an original data transmitted by a transmitting terminal. In the present embodiment, the D-type flip-flop 140 samples the first digital signal DS1 with a rising edge of the clock signal CLK.

In the following teaching, there is further instruction regarding a work mechanism of the signal demodulation module 100.

Figure 2:
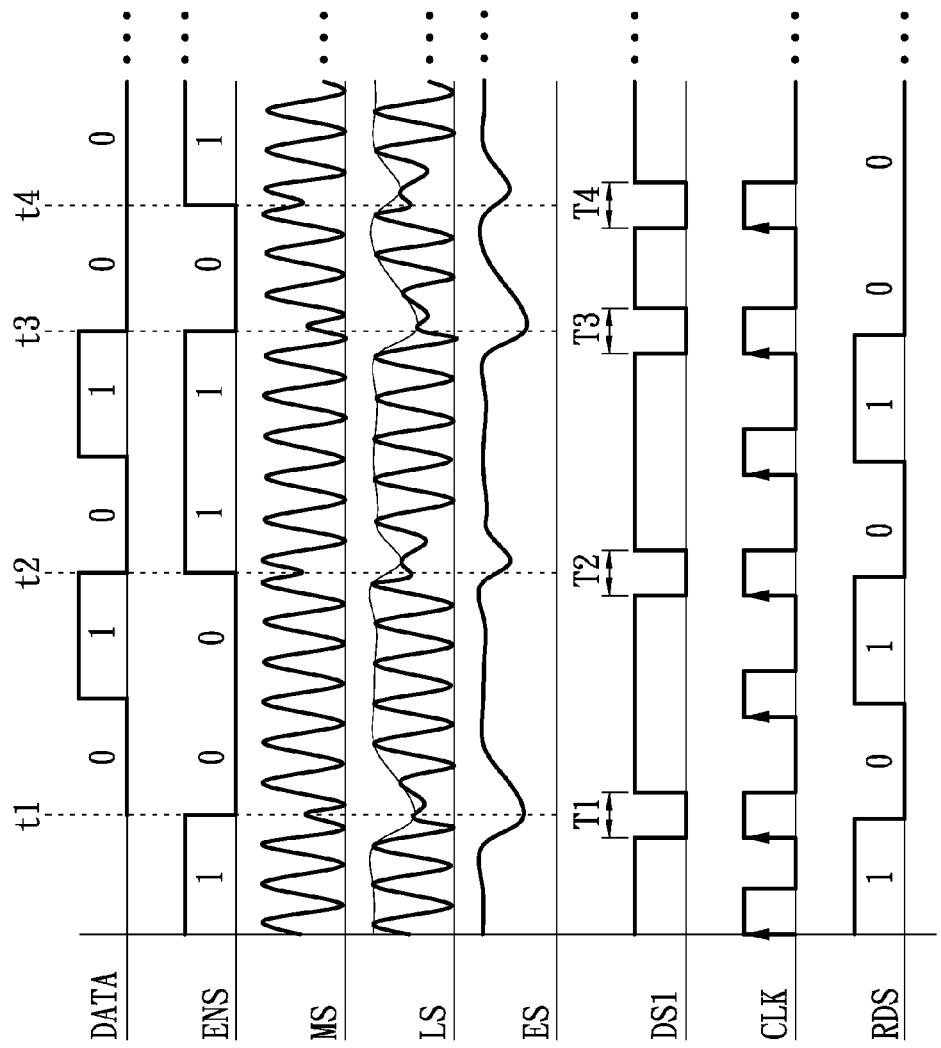
FIG. 2 shows a waveform diagram of digital communication according to the embodiment of the instant disclosure.

Referring to FIGS. 1 and 2, FIG. 2 shows a waveform diagram of digital communication according to the embodiment of the instant disclosure. For an easy instruction of the instant disclosure, data of the digital communication shown in FIG. 2 is taken as an example, and it is not limited thereto. According to types of wireless communication systems, wireless communication equipment are able to directly or indirectly communicate with other wireless communication equipment, and the wireless communication equipment may be: a cellular phone, a bidirectional radio transceiver, a personal digital assistant (PDA), a personal computer (PC), a laptop, a home entertainment device. When a transceiver communicates, a transmitter (not shown in FIG. 1) follows a wireless communication standard of a generated base-band signal to modulate data, and transform the data into a radio frequency signal, and the base-band signal is frequency-mixed in one or a plurality of IF stage and the local oscillator to generate a radio frequency signal. In the present embodiment, in comparison to the industrial, scientific and medical (ISM) radio bands, a 400 MHz medium frequency band is more suitable to transmit signals in human bodies. Therefore, a transmitting objective of the instant disclosure is with a specification in accordance with the 400 MHz medium frequency band.

In the present embodiment, the transmitter modulates code of an original data DATA, such as "010100," so as to form a coding signal ENS, such as "1001101," wherein a first bit "one" is an initial value, and a process from the original data DATA to the coding signal ENS is a modulation through DPSK. Afterwards, the transmitter modulates the coding signal ENS to form the digital modulation signal MS and emits out of a launch end. In the present embodiment, the transmitter modulates the original data DATA through the DPSK, and thus the digital modulation signal MS is a differential phase shift keying modulation signal. Afterwards, the injection-locked oscillator 110 first receives the digital modulation signal MS and then the injection-locked oscillator 110 outputs the phase-locked oscillating signal LS, wherein the central oscillating frequency of the injection-locked oscillator 110 is equal to the frequency of the digital modulation signal MS. It is noticed that, since the injection-locked oscillator 110 outputs the phase-locked oscillating signal LS which is in-phase to the digital modulation signal MS, then a phase of the injection-locked oscillator 110 changes with the input phase of the digital modulation signal MS. In other words, the output phase of the phase-locked oscillating signal LS synchronously changes with the input phase of the digital modulation signal MS.

Furthermore, at time point "t1," when the input phase of the digital modulation signal MS is reversed for 180 degrees, the phase change of the digital modulation signal MS forces the amplitude and the phase of the injection-locked oscillator 110 to be affected. Regarding the phase change, the injection-locked oscillator 110 has features of the digital modulation signal MS and the phase-locked oscillating signal LS; which means, when the input phase of the digital modulation signal MS is reversed for 180 degrees, the output phase of the phase-locked oscillating signal LS is reversed for 180 degrees as well. As for the amplitude change, the phase-locked oscillating signal LS with a new phase outputted by the injection-locked oscillator 110 is a sum of the digital modulation signal MS with a changed phase and the phase-locked oscillating signal LS in an original state, and the amplitude of the phase-locked oscillating signal LS accordingly becomes temporarily smaller. It is worth mentioning that when the output phase of the phase-locked oscillating signal LS is reversed for 180 degrees, the amplitude of the phase-locked oscillating signal LS becomes temporarily smaller in comparison to the amplitude of the phase-locked oscillating signal LS in the pre-state, and corresponds to a time when a logic data (1→0 or 0→1) of the coding signal ENS changes, as shown in FIG. 2. Likewise, at time points "t2," "t3," and "t4," when the input phase of the digital modulation signal MS is reversed for 180 degrees, the output phase of the phase-locked oscillating signal LS is reversed for 180 degrees as well, wherein the amplitude of the phase-locked oscillating signal LS becomes temporarily smaller in comparison to the amplitude of the phase-locked oscillating signal LS in the pre-state, and the instant disclosure demodulates a DPSK signal with the feature.

Afterwards, in the present embodiment, the instant disclosure is that the envelope detector 120 detects the envelope line of the phase-locked oscillating signal LS, and the envelope detector 120 outputs the envelope signal ES which is analogic according to the envelope line detected. Furthermore, as shown in FIG. 2, the envelope detector 120 receives the phase-locked oscillating signal LS transmitted by the injection-locked oscillator 110, and outputs the envelope signal ES according to the envelope line of the phase-locked oscillating signal LS detected. It is worth noticing that, a concave part of an amplitude waveform of the envelope signal ES corresponds to a part that the output phase of the phase-locked oscillating signal LS is reversed for 180 degrees; in other words, the concave part of an amplitude waveform of the envelope signal ES corresponds to a part that the amplitude of the phase-locked oscillating signal LS temporarily becomes smaller. Therefore, a synchronous change of the phases of the digital modulation signal MS and the phase-locked oscillating signal LS may be demodulated with an amplitude modulation. Briefly, the instant disclosure is to convert a phase modulation signal into an amplitude modulation signal; which means that a phase demodulation work is replaced with an amplitude demodulation work. Afterwards, the envelope detector 120 transmits the envelope signal ES to the data slicer 130 to proceed to another signal processing in the next stage.

When the data slicer 130 receives the envelope signal ES, in the present embodiment, the data slicer 130 runs an averaging operation on the highest and the lowest amplitudes of the envelope signal ES to obtain a result as the reference voltage; in another embodiment, the designer is able to use other more accurate methods to design the reference voltage, and thus it is not limited thereto. Afterwards, the data slicer 130 runs a comparing operation on the envelope signal ES and the reference voltage, and makes a determination according to a comparing result and outputs the first digital signal DS1. Furthermore, when the data slicer 130 determines that a voltage of the envelope signal ES is larger than the reference voltage, the data slicer 130 outputs the first digital signal DS1 of a high level voltage. When the data slicer 130 determines that a voltage of the envelope signal ES is smaller than the reference voltage, the data slicer 130 outputs the first digital signal DS1 of a low level voltage, wherein the time interval T1~T4 of the first digital signal DS1 of the low level voltage corresponds to the time interval when the input phase of the digital modulation signal MS and the output phase of the phase-locked oscillating signal LS synchronously change. In other words, the time interval T1~T4 of the first digital signal DS1 of the low level voltage corresponds to the concave part of the amplitude waveform of the envelope signal ES. Besides, the duration of this time interval T1~T4 depends on the front-end gain of the preceding stages. Accordingly, the instant disclosure is able to achieve a demodulation effect which is to transform the phase modulation into the amplitude modulation; in addition, in an embodiment, through adjusting the capacity of the injection-locked oscillator 110 with the automatic frequency correcting circuit, the central oscillating frequency of the phase-locked oscillating signal LS is changed thereby.

Afterwards, in the instant disclosure, the D-type flip-flop 140 plays a role which converts a return-to-zero code (RZ) into a non-return-to-zero code (NRZ). A data input end of the D-type flip-flop 140 receives the first digital signal DS1 transmitted by the data slicer 130, and the D-type flip-flop 140 samples the first digital signal DS1 through a rising edge of the clock signal CLK to output a recovery digital signal RDS from a data output end. Furthermore, as shown in FIG. 2, during time points "t1-t4", the rising edge of the clock signal CLK samples the first digital signal DS1 of the low level voltage, and thus the D-type flip-flop 140 outputs a digital logic: "zero." On the other hand, at other sampling time points, the rising edge of the clock signal CLK samples the first digital signal DS1 of the high level voltage, and thus the D-type flip-flop 140 outputs the digital logic: "one." It is worth mentioning that the digital data "010100" of the recovery digital signal RDS outputted by the D-type flip-flop 140 is equal to the original data DATA, and thus the signal demodulation module 100 of the instant disclosure is able to achieve the demodulation which transforms the phase modulation into the amplitude modulation.

In addition, in comparison to the technique in the prior arts, which demodulate the PSK with the injection-locked oscillator, and there are two oscillators needed, and the central oscillating frequency of the two oscillators must be respectively higher and lower than a frequency of a signal injected, and thus a great input power is required for a regular operation. However, there is only one injection-locked oscillator 110 needed to achieve a central work of a phase demodulation in the instant disclosure, wherein the central oscillating frequency of the injection-locked oscillator 110 is equal to the frequency of the injected signal; therefore, the input power needed in the present embodiment is relatively lower than the input power needed in the prior arts, and more suitable for transmitting signal in the human body to meet the requirement of low power efficiency. Furthermore, the signal demodulation module 100 is able to avoid a pulling effect between two oscillators in the prior arts, and thus the sensibility and energy efficiency of the receiver are raised. As a result the instant disclosure is able to greatly simplify a circuit design and reduce a circuit designing cost.

In the following description, there is an embodiment of unifying the width of every bit of the first digital signal DS1.

[Embodiment of a Signal Demodulation Module]

Figure 3:
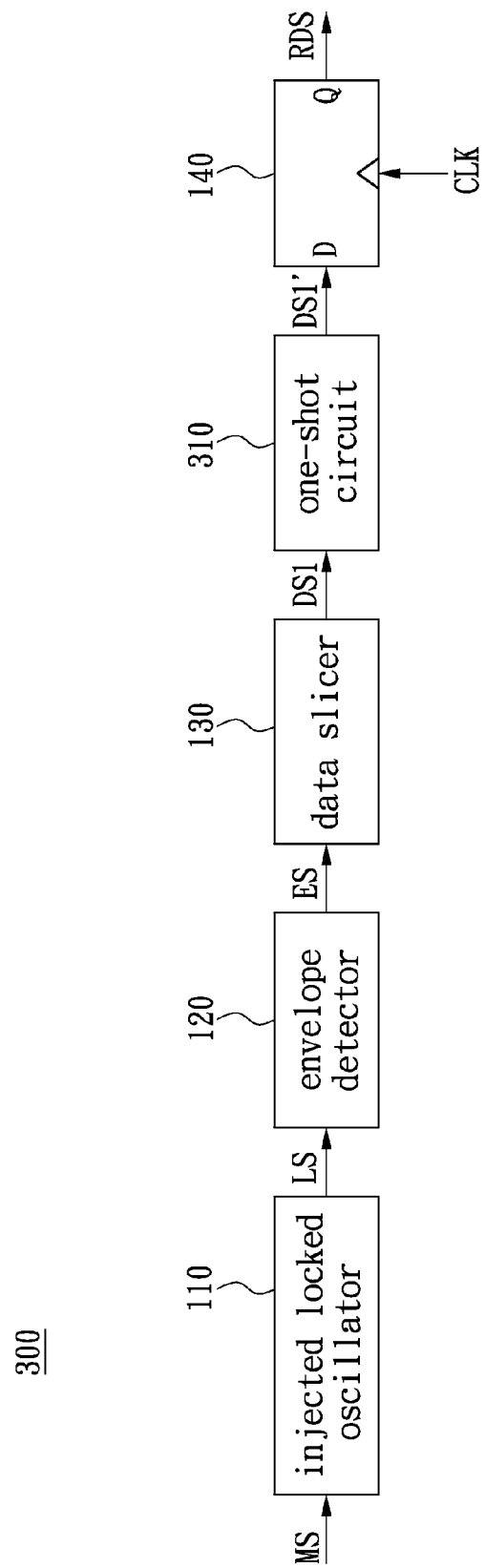
FIG. 3 shows a block diagram of a signal demodulation module according to an embodiment of the instant disclosure.

Referring to FIG. 3, FIG. 3 shows a block diagram of a signal demodulation module 300 according to an embodiment of the instant disclosure. Different from the embodiment in FIG. 1, in the present embodiment, the signal demodulation module 300 further includes a one-shot circuit 310. The one-shot circuit 310 is connected between a data slicer 130 and a D-type flip-flop 140.

In the present embodiment, the one-shot circuit 310 unifies the range of the time interval of every bit of a first digital signal DS1 time interval, and the one-shot circuit 310 outputs an adjusted first digital signal DS1'. The data slicer 130 compares the reference voltage with the envelope signal ES to convert an envelope signal ES of an analog signal into the first digital signal DS1 of a digital signal. During a process of converting the analog signal into the digital signal, it is possibly resulted in the range of time interval of every bit of the first digital signal DS1 to be different, and through the adjustment to the first digital signal DS1 made by the one-shot circuit 310 of the present embodiment, a waveform of the first digital signal DS1 may be closer to the digital signal. Regarding relevant operation mechanism of the present embodiment, it is identical to the embodiment in FIG. 1, and it is not repeated thereto.

For specific instruction of an operation flow of the signal demodulation module 300 of the instant disclosure, there is at least one embodiment recited below for further instruction.

In the following embodiments, there are only parts different from embodiments in FIG. 3 described, and the omitted parts are indicated to be identical to the embodiments in FIG. 3. In addition, for an easy instruction, similar reference numbers or symbols refer to elements alike.

[Embodiment of a Signal Demodulation Module]

Figure 4:
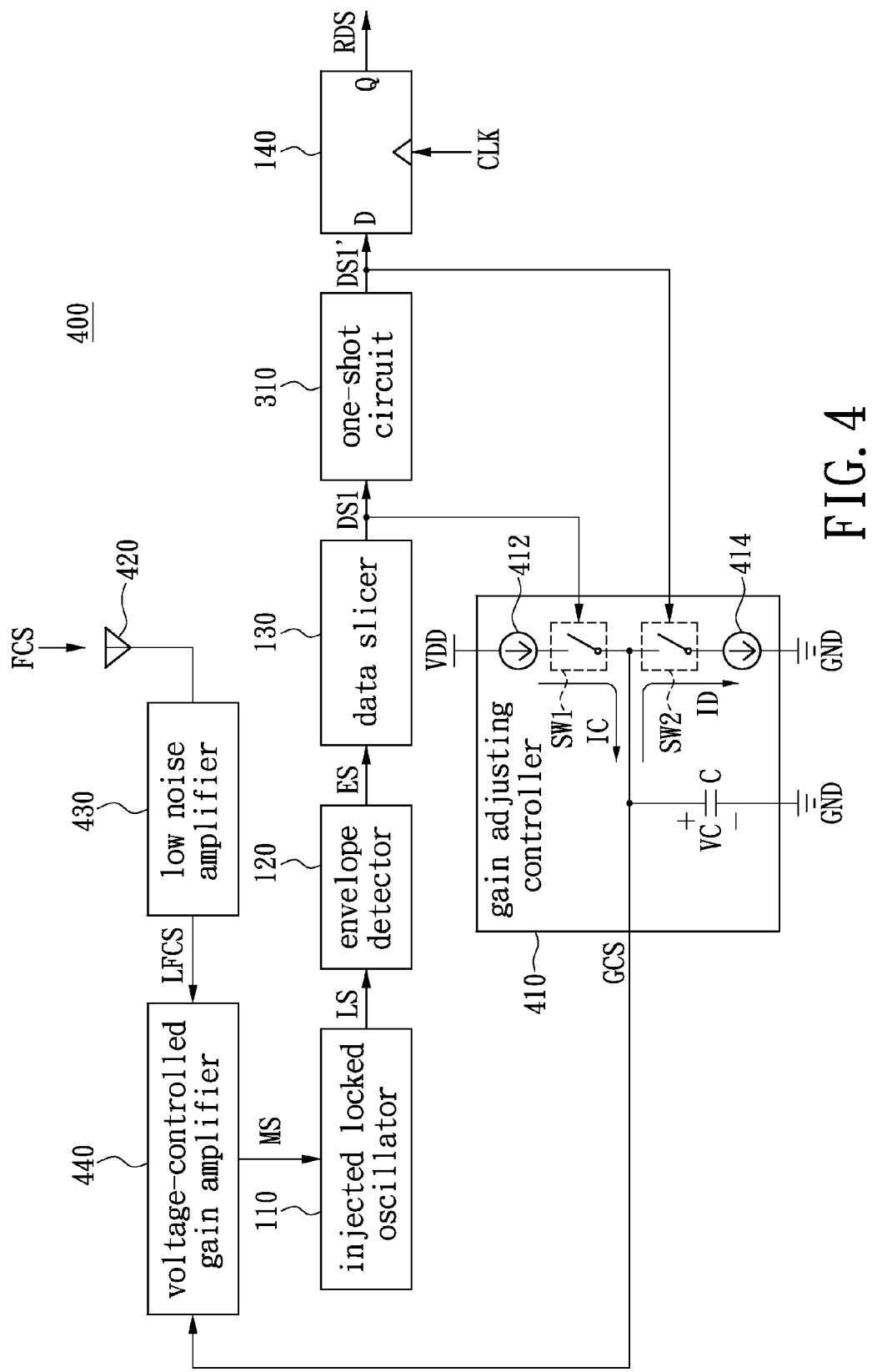
FIG. 4 shows a block diagram of a signal demodulation module according to an embodiment of the instant disclosure.

Referring to FIG. 4, FIG. 4 shows a block diagram of a signal demodulation module 400 according to an embodiment of the instant disclosure. Different from the embodiment in FIG. 3, in the present embodiment, the signal demodulation module 400 further includes a gain adjusting controller 410, an antenna 420, a low noise amplifier 430, and a voltage-controlled gain amplifier 440, wherein the gain adjusting controller 410 includes a first switch SW1, a second switch SW2 and a storing capacitor C.

The gain adjusting controller 410 is connected to the voltage-controlled gain amplifier 440. The antenna 420 is connected to the low noise amplifier 430. The voltage-controlled gain amplifier 440 is connected between a low noise amplifier and an injection-locked oscillator 110. In addition, regarding elements inside the gain adjusting controller 410, a first terminal of the first switch SW1 is connected to a terminal of the first current source 412, wherein another terminal of the first current source 412 is connected to a system voltage VDD. A terminal of the second switch SW2 is connected to another terminal of the first switch SW1, and another terminal of the second switch SW2 is connected to a terminal of the second current source 414, wherein another terminal of the second current source 414 is connected to a ground voltage GND. A terminal of the storing capacitor C is connected to between the first switch SW1 and the second switch SW2, and another terminal of the storing capacitor C is connected to the ground voltage GND.

In the present embodiment, the gain adjusting controller 410 receives a first digital signal DS1 and an adjusted first digital signal DS1', and outputs a gain adjusting control signal GCS to the voltage-controlled gain amplifier 440 according to the first digital signal DS1 and the adjusted first digital signal DS1', and accordingly adjusts a parameter of a gain in the voltage-controlled gain amplifier 440. Furthermore, in the gain adjusting controller 410, the first switch SW1 receives the first digital signal DS1 and accordingly determines the first switch SW1 to be switched on or off. The second switch SW2 receives the adjusted first digital signal DS1' and accordingly determines the second switch SW2 to be switched on or off. The antenna 420 receives a high frequency carrier signal FCS, wherein the high frequency carrier signal FCS includes a data of a recovery digital signal RDS; which means, the high frequency carrier signal FCS carries an original data of a transmitting terminal. The low noise amplifier 430 receives the high frequency carrier signal FCS transmitted by the antenna 420, processes the high frequency carrier signal FCS, and outputs a low-noise high frequency carrier signal LFCS. The voltage-controlled gain amplifier 430 receives the low-noise high frequency carrier signal LFCS and the gain adjusting control signal GCS, and the voltage-controlled gain amplifier 430 adjusts an amplitude of the low-noise high frequency carrier signal LFCS according to the gain adjusting control signal GCS and outputs a digital modulation signal MS.

For further understanding of the instant disclosure, there is more instruction of an operation mechanism of the signal demodulation module 400 in the following description.

Referring to FIG. 4 with FIG. 2, when a transceiver proceeds a wireless communication, the transmitting terminal modulates the original data DATA, such as "010100" through coding to form a coding signal ENS, such as "1001101," wherein the first bit "one" is an initial value, and a process from the original data DATA to the coding signal ENS is a modulation with a DPSK. Afterwards, the transceiver proceeds a modulation on the coding signal ENS to form the digital modulation signal MS and digital modulation signal MS emits out of an emitting terminal, wherein the digital modulation signal MS is a differential phase shift keying modulation signal. Afterwards, the antenna 420 proceeding the wireless communication receives the high frequency carrier signal FCS carrying the original data DATA, and the high frequency carrier signal FCS is transmitted to the low noise amplifier 430. The low noise amplifier 430 proceeds the noise processing on the high frequency carrier signal FCS received to output the low-noise high frequency carrier signal LFCS, which is clearer, to the voltage-controlled gain amplifier 440. The voltage-controlled gain amplifier 440 further amplifies the low-noise high frequency carrier signal LFCS received, and the voltage-controlled gain amplifier 440 adjusts an amplifying degree of the low-noise high frequency carrier signal LFCS according to the gain adjusting control signal GCS. It is worth mentioning that the gain adjusting control signal GCS is relevant to the first digital signal DS1 and the adjusted first digital signal DS1'; which means, the instant disclosure adjusts times of amplifying of the voltage-controlled gain amplifier 440 through a feedback mechanism, and there is further instruction recited below.

Afterwards, the injection-locked oscillator 110 receives the digital modulation signal MS in order and the injection-locked oscillator 110 outputs the phase-locked oscillating signal LS, wherein the central oscillating frequency of the injection-locked oscillator 110 is equal to the frequency of the digital modulation signal MS. It is noticed that, since the injection-locked oscillator 110 outputs the phase-locked oscillating signal LS which is in-phase to the digital modulation signal MS, then a phase of the injection-locked oscillator 110 changes with the input phase of the digital modulation signal MS. In other words, the output phase of the phase-locked oscillating signal LS synchronously changes with the input phase of the digital modulation signal MS, wherein a change of the input phase of the digital modulation signal MS corresponds to a conversion of a coding signal from a high level logic (such as a digital logic "one") to a low level logic (such as a digital logic "zero").

Furthermore, at time point "t1," when the input phase of the digital modulation signal MS is reversed for 180 degrees, the phase change of the digital modulation signal MS forces an amplitude and a phase of the phase-locked oscillating signal LS to be affected; regarding the phase change, the injection-locked oscillator 110 has features of the digital modulation signal MS and the phase-locked oscillating signal LS; which means, when the input phase of the digital modulation signal MS is reversed for 180 degrees, the output phase of the phase-locked oscillating signal LS is reversed for 180 degrees as well. As for the amplitude change, the phase-locked oscillating signal LS with a new phase outputted by the injection-locked oscillator 110 is a sum of the digital modulation signal MS with a changed phase and the phase-locked oscillating signal LS in an original state, and the amplitude of the phase-locked oscillating signal LS accordingly becomes temporarily smaller. It is worth mentioning that when the output phase of the phase-locked oscillating signal LS is reversed for 180 degrees, the amplitude of the phase-locked oscillating signal LS becomes temporarily smaller in comparison to the amplitude of the phase-locked oscillating signal LS in the pre-state, and corresponds to a time when a logic data (1→0 or 0→1) of the coding signal ENS changes, as shown in FIG. 2. Likewise, at time points "t2," "t3," and "t4," when the input phase of the digital modulation signal MS is reversed for 180 degrees, the output phase of the phase-locked oscillating signal LS is reversed for 180 degrees as well, wherein the amplitude of the phase-locked oscillating signal LS becomes temporarily smaller in comparison to the amplitude of the phase-locked oscillating signal LS in the pre-state, and the instant disclosure demodulates a DPSK signal with the feature.

Afterwards, in the present embodiment, the instant disclosure is that the envelope detector 120 detects the envelope line of the phase-locked oscillating signal LS, and the envelope detector 120 outputs the envelope signal ES which is analogic according to the envelope line detected. Furthermore, as shown in FIG. 2, the envelope detector 120 receives the phase-locked oscillating signal LS transmitted by the injection-locked oscillator 11, and outputs the envelope signal ES according to the envelope line of the phase-locked oscillating signal LS detected. It is worth noticing that, a concave part of an amplitude waveform of the envelope signal ES corresponds to a part of the output phase of the phase-locked oscillating signal LS reversed for 180 degrees; in other words, the concave part of an amplitude waveform of the envelope signal ES corresponds to a part that the amplitude of the phase-locked oscillating signal LS temporarily becomes smaller. Therefore, a synchronous change of the phases of the digital modulation signal MS and the phase-locked oscillating signal LS may be demodulated with an amplitude modulation. Briefly, the instant disclosure is to convert a phase modulation signal into an amplitude modulation signal; which means that a phase demodulation work is replaced with an amplitude demodulation work. Afterwards, the envelope detector 120 transmits the envelope signal ES to the data slicer 130 to proceed to another signal processing in the next stage.

When the data slicer 130 receives the envelope signal ES, in the present embodiment, the data slicer 130 runs an averaging operation on the highest and the lowest amplitudes of the envelope signal ES to obtain a result as the reference voltage; in another embodiment, the designer is able to use other more accurate methods to design the reference voltage, and thus it is not limited thereto. Afterwards, the data slicer 130 runs a comparing operation on the envelope signal ES and the reference voltage, and makes a determination according to a comparing result and outputs the first digital signal DS1. Furthermore, when the data slicer 130 determines that a voltage of the envelope signal ES is larger than the reference voltage, the data slicer 130 outputs the first digital signal DS1 of a high level voltage. When the data slicer 130 determines that a voltage of the envelope signal ES is smaller than the reference voltage, the data slicer 130 outputs the first digital signal DS1 of a low level voltage, wherein the time interval T1~T4 of the first digital signal DS1 of the low level voltage corresponds to the time interval when the input phase of the digital modulation signal MS and the output phase of the phase-locked oscillating signal LS synchronously change. In other words, the time interval T1~T4 of the first digital signal DS1 of the low level voltage corresponds to the concave part of the amplitude waveform of the envelope signal ES. Besides, the duration of this time interval T1~T4 depends on the front-end gain of the preceding stages. Accordingly, the instant disclosure is able to achieve a demodulation effect which is to transform the phase modulation into the amplitude modulation; in addition, in an embodiment, through adjusting the capacity of the injection-locked oscillator 110 with the automatic frequency correcting circuit, the central oscillating frequency of the phase-locked oscillating signal LS is changed thereby.

However, during a process of the data slicer 130 converts the analog signal into the digital signal, the width of every bit of the first digital signal DS1 outputted by the data slicer 130 may not be totally the same. Therefore, the instant disclosure further optimizes the first digital signal DS1 through the one-shot circuit 310. In other words, the one-shot circuit 310 unifies the range of time interval of every bit of the first digital signal DS1 received, and outputs an adjusted first digital signal DS1' which is much closer to a demand. Moreover, the instant disclosure further optimizes the first digital signal DS1 through a feedback mechanism; which means that the first digital signal DS1 feedbacks to the first switch SW1 and the adjusted first digital signal DS1' is connected to the second switch SW2 through the feedback. Before further instruction, is it clarified that when the first digital signal DS1 is the high level voltage, the first switch SW1 is switched on; when the first digital signal DS1 is the low level voltage, the first switch SW1 is cut off. When the adjusted first digital signal DS1' is the high level voltage, the second switch SW2 is switched on; when the adjusted first digital signal DS1' is the low level voltage, the second switch SW2 is cut off.

When the first switch SW1 is switched on and the second switch SW2 is cut off, the first current source 412 generates a charging current IC, and proceeds charging on the storing capacitor C through first switch SW1 to generate a capacitor voltage VC, wherein, in the present embodiment, the capacitor voltage VC is the gain adjusting control signal GCS. Furthermore, when the first switch SW1 is cut off and the second switch SW2 is switched on, the second current source 414 generates a discharging current ID and the discharging current ID flows from the storing capacitor C to a ground terminal (i.e. the terminal of the ground voltage GND) of the second switch SW2 to allow the storing capacitor C proceeding discharging; which means to release the capacitor voltage VC of the storing capacitor C. When the first switch SW1 is switched on while the second switch SW1 is cut off or shut down, the capacitor voltage VC of the storing capacitor C stays the same. Accordingly, the voltage-controlled gain amplifier 440 is able to adjust the amplitude of the digital modulation signal MS according to the capacitor voltage VC received, and which allows the signal demodulation module 400 is able to further adjust the width of every bit of the first digital signal DS1.

Afterwards, the data input end of the D-type flip-flop 140 receives the adjusted first digital signal DS1' transmitted by the one-shot circuit 310, and the D-type flip-flop 140 samples the adjusted first digital signal DS1' through the rising edge of the clock signal CLK to output the recovery digital signal RDS from the data output end. The rest of the work mechanism is identical to the embodiment in FIG. 1 recited above, and it is not repeated thereto.

Therefore, in the present embodiment, the signal demodulation module 400 is able to achieve the demodulation by transforming the phase modulation to the amplitude modulation. Moreover, in comparison to the two oscillators required in the prior arts, there is only one injection-locked oscillator 110 needed to achieve a central work of a phase demodulation in the instant disclosure, wherein the central oscillating frequency of the injection-locked oscillator 110 is equal to the frequency of the injected signal; therefore, the input power needed in the present embodiment is relatively lower than the input power needed in the prior arts, and more suitable for transmitting signal in the human body to meet the requirement of low power efficiency. Furthermore, the signal demodulation module 400 is able to avoid a pulling effect between two oscillators in the prior arts, and thus the sensibility and energy efficiency of the receiver are raised. As a result the instant disclosure is able to greatly simplify a circuit design and reduce a circuit designing cost.

[Embodiment of a Signal Demodulation Method of a Signal Demodulation Module]

Figure 5:
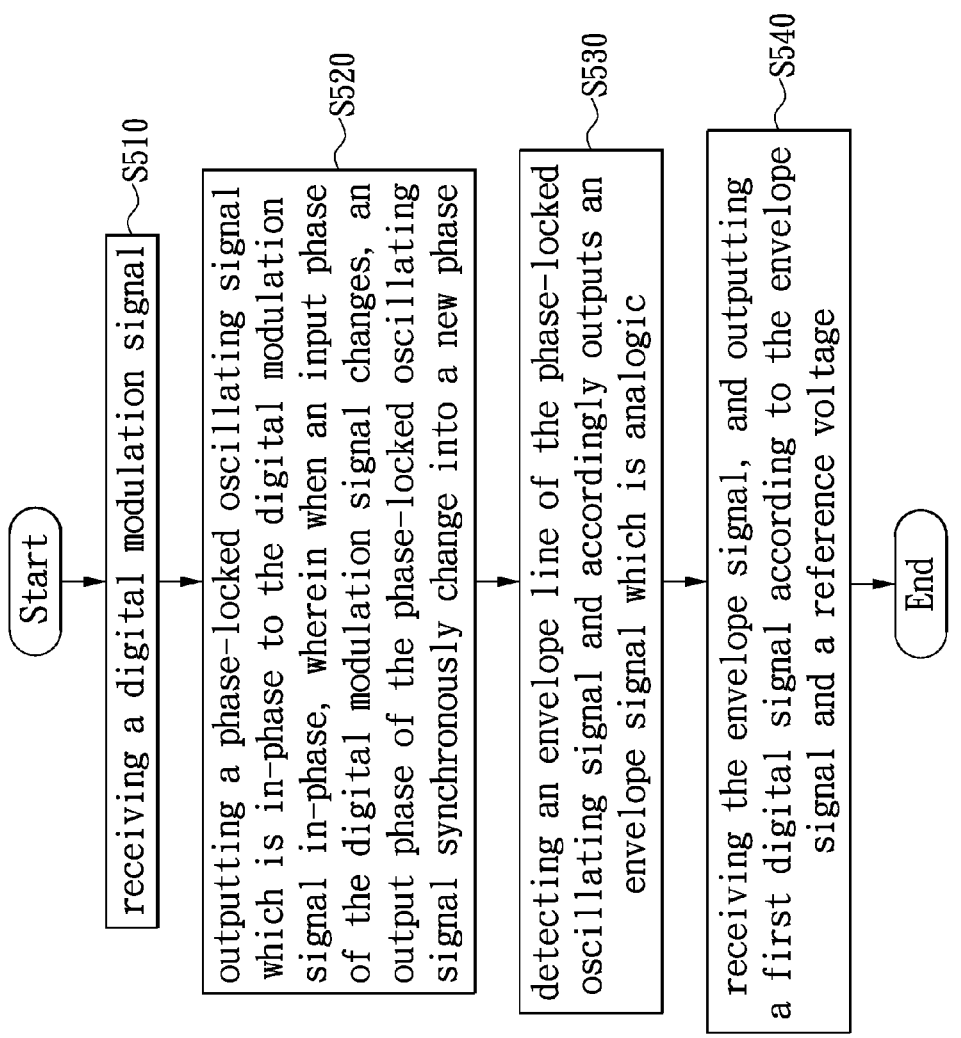
FIG. 5 shows a flow chart of the signal demodulation method according to the embodiment of the instant disclosure.

Referring to FIG. 5, FIG. 5 shows a flow chart of the signal demodulation method according to the embodiment of the instant disclosure. Explanatory steps of the present embodiment may be embodied with the signal demodulation module 100 in FIG. 1, and thus FIG. 1 is referred for an easy instruction and better understanding. The signal demodulation method include steps as follows: receiving a digital modulation signal (S510); outputting a phase-locked oscillating signal which is in-phase to the digital modulation signal in-phase, wherein when an input phase of the digital modulation signal changes, an output phase of the phase-locked oscillating signal synchronously change into a new phase (S520); detecting an envelope line of the phase-locked oscillating signal and accordingly outputs an envelope signal which is analogic (S530); receiving the envelope signal, and outputting a first digital signal according to the envelope signal and a reference voltage (S540). It is worth mentioning that, a central oscillating frequency is equal to a frequency of the digital modulation signal, and when the output phase of the injection-locked oscillator changes, an amplitude of the phase-locked oscillating signal will temporarily be relatively small compared to the amplitude of the phase-locked oscillating signal in a pre-state.

Relevant details of the steps of the signal demodulation method regarding the signal demodulation module are described in the embodiments of FIG. 1, and thus it is not repeated thereto. It is clarified that, a sequence of steps in FIG. 5 is set for a need to instruct easily, and thus the sequence of the steps is not used as a condition in demonstrating the embodiments of the instant disclosure.

[Embodiment of a Receiver]

Figure 6:
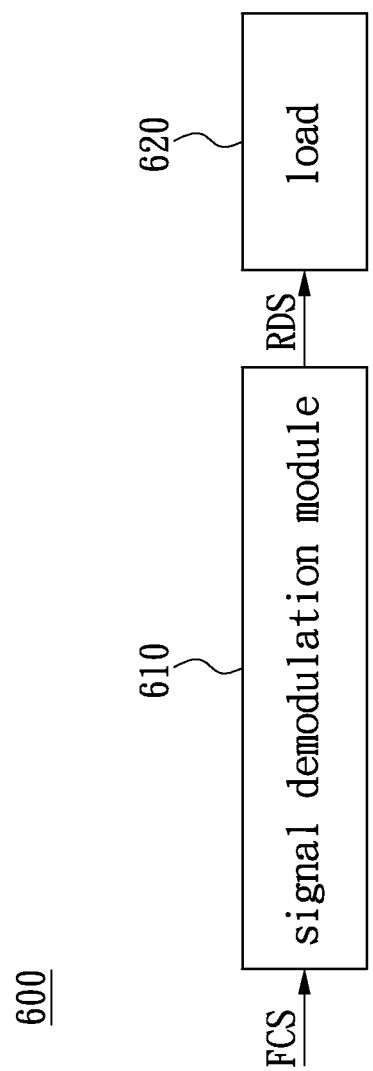
FIG. 6 shows a block diagram of a receiver according to the embodiment of the instant disclosure.

Referring to FIG. 6, FIG. 6 shows a block diagram of a receiver 600 according to the embodiment of the instant disclosure. The receiver 600 includes a load 620 and a signal demodulation module 610 electrically connected to the load 620, wherein the signal demodulation module 610 receives a high frequency carrier signal FCS to demodulate the digital modulation signal, wherein the high frequency carrier signal FCS carries an original data transmitting a wireless communication. The signal demodulation module 610 may be a signal demodulation module 100-300 and 400 in the embodiment for outputting a recovery digital signal RDS to the load 620. The load 620 receives the recovery digital signal RDS to proceed a normal work.

To sum up, the receiver, signal demodulation module and the demodulation method thereof are able to achieve the demodulation work through transforming the phase modulation into the amplitude modulation, and as a result, the design is greatly simplified as a base frequency circuit which is no need of a synchronous circuit.

In at least one of the embodiment of the instant disclosure, in comparison to the two oscillators required in the prior arts, there is only one injection-locked oscillator 110 needed to achieve a central work of a phase demodulation in the instant disclosure, wherein the central oscillating frequency of the injection-locked oscillator is equal to the frequency of the injected signal; therefore, the input power needed in the present embodiment is relatively lower than the input power needed in the prior arts, and more suitable for transmitting signal in the human body to meet the requirement of low power efficiency.

In at least one of the embodiment of the instant disclosure, the signal demodulation module is able to avoid a pulling effect between two oscillators in the prior arts, and thus the sensibility and energy efficiency of the receiver are raised.

As a result, the instant disclosure is able to greatly simplify a circuit design and reduce a circuit designing cost.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A signal demodulation module, comprising:
an injection-locked oscillator, having a central oscillating frequency, receiving a digital modulation signal, and outputting a phase-locked oscillating signal which is in phase to the digital modulation signal, and when an input phase of the digital modulation signal changes, an output phase of the injection-locked oscillator changes synchronously, wherein the central oscillating frequency is equal to a frequency of a digital modulation signal;
an envelope detector, connected to the injection-locked oscillator, and the envelope detector detecting an envelope line of the phase-locked oscillating signal and outputting an envelope signal which is analogic accordingly; and
a data slicer, connected to the envelope detector, and the data slicer having a reference voltage and receiving the envelop signal, and the data slicer outputting a first digital signal according to the reference voltage and the envelop signal;
wherein when the output phase of the injection-locked oscillator changes, an amplitude of the phase-locked oscillating signal will temporarily be relatively small compared to the amplitude of the phase-locked oscillating signal in a pre-state.

2. The signal demodulation module according to claim 1, wherein the digital modulation signal is a differential phase shift keying modulation signal, and a time interval of the first digital signal of a low level voltage corresponds to a time interval of a synchronous change between the input phase of the digital modulation signal and the output phase of the phase-locked oscillating signal.

3. The signal demodulation module according to claim 1, wherein when the input phase of the digital modulation signal is reversed for 180 degrees, then the output phase of the phase-locked oscillating signal will be reversed for 180 degrees as well.

4. The signal demodulation module according to claim 1, further comprising:

a D-type flip-flop, connected to the data slicer, the D-type flip-flop having a data input end which receives the first digital signal, and a clock input end receiving a clock signal, and a data output end outputting a recovery digital signal, wherein the D-type flip-flop samples the first digital signal with a rising edge of the clock signal.

5. The signal demodulation module according to claim 1, further comprising:
a one-shot circuit, connected to a data slicer, and the one-shot circuit unifying the range of the time interval of every bit of a first digital signal time interval, and outputting an adjusted first digital signal; and
a D-type flip-flop, connected to the data slicer, and the D-type flip-flop having a data input end receiving an adjusted first digital signal, and a clock input end receiving a clock signal, and a data output end outputting a recovery digital signal,
wherein the D-type flip-flop samples the first digital signal with a rising edge of the clock signal.

6. The signal demodulation module according to claim 5, further comprising:
a gain adjusting controller, receiving a first digital signal and an adjusted first digital signal, and accordingly outputting a gain adjusting control signal.

7. The signal demodulation module according to claim 6, wherein the gain adjusting controller comprising:
a first switch, having a terminal connected to a terminal of a first current source, wherein the first switch receives the first digital signal and accordingly determines the first switch to be switched on or off;
a second switch, having a terminal connected to another terminal of the first switch, and another terminal connected to a second current source, wherein the second switch receives the adjusted first digital signal and accordingly determines the second switch to be switched on or off; and
a storing capacitor, having a terminal connected between the first switch and the second switch and outputting the gain adjusting control signal, and another terminal of the storing capacitor is connected to the ground voltage, wherein the gain adjusting control signal is a capacitor voltage of the storing capacitor.

8. The signal demodulation module according to claim 7, wherein when the first switch is switched on and the second switch is cut off, the first current source generates a charging current and proceeds charging to the storing capacitor through the first switch; when the first switch is cut off and the second switch is switched on, the second current source generates a discharging current and the discharging current flows from the storing capacitor to the second switch to allow the storing capacitor to proceed discharging; and when the first switch is switched on while the second switch is cut off or shut down, the capacitor voltage of the storing capacitor stays the same.

9. The signal demodulation module according to claim 6, further comprising:
an antenna, receiving a high frequency carrier signal, wherein the high frequency carrier signal includes an information of a recovery digital signal;
a low noise amplifier, connected to the antenna, and the low noise amplifier receiving the high frequency carrier signal transmitted by the antenna, processing the high frequency carrier signal, and outputting a low-noise high frequency carrier signal; and
a gain adjusting controller, connected to the low noise amplifier, and the voltage-controlled gain amplifier receiving the low-noise high frequency carrier signal and a gain adjusting control signal, and the voltage-controlled gain amplifier adjusting an amplitude of the low-noise high frequency carrier signal according to the gain adjusting control signal and outputting a digital modulation signal.

10. A signal demodulation method, for a signal demodulation module, and the signal demodulation module comprises an injection-locked oscillator, an envelope detector and a data slicer, wherein the injection-locked oscillator has a central oscillating frequency, and the signal demodulation method includes:
receiving a digital modulation signal;
outputting a phase-locked oscillating signal which is in-phase to the digital modulation signal, wherein when an input phase of the digital modulation signal changes, an output phase of the phase-locked oscillating signal synchronously changes into a new phase;
detecting an envelope line of the phase-locked oscillating signal and accordingly outputting an envelope signal which is analogic;
receiving the envelope signal, and outputting a first digital signal according to the envelope signal and a reference voltage;
wherein the central oscillating frequency is equal to a frequency of the digital modulation signal, and when the output phase of the injection-locked oscillator changes, an amplitude of the phase-locked oscillating signal will temporarily be relatively small compared to the amplitude of the phase-locked oscillating signal in a pre-state.

11. The signal demodulation method according to claim 10, wherein the digital modulation signal is a differential phase shift keying modulation signal, and a time interval of the first digital signal of a low level voltage corresponds to a time interval of a synchronous change between the input phase of the digital modulation signal and the output phase of the phase-locked oscillating signal.

12. The signal demodulation method according to claim 10, wherein when the input phase of the digital modulation signal is reversed for 180 degrees, then the output phase of the phase-locked oscillating signal is reversed for 180 degrees as well.

13. The signal demodulation method according to claim 10, further comprising:
a D-type flip-flop, connected to the slicer, the D-type flip-flop having a data input end which receives the first digital signal, and a clock input end receiving a clock signal, and a data output end outputting a recovery digital signal,
wherein the D-type flip-flop samples the first digital signal with a rising edge of the clock signal.

14. The signal demodulation method according to claim 10, further comprising:
a one-shot circuit, connected to a data slicer, and the one-shot circuit unifying the range of the time interval of every bit of a first digital signal time interval, and outputting an adjusted first digital signal; and
a D-type flip-flop, connected to the data slicer, and the D-type flip-flop having a data input end receiving an adjusted first digital signal, and a clock input end receiving a clock signal, and a data output end outputting a recovery digital signal,
wherein the D-type flip-flop samples the first digital signal with a rising edge of the clock signal.

15. The signal demodulation method according to claim 14, further comprising:

a gain adjusting controller, receiving a first digital signal and an adjusted first digital signal, and accordingly outputting a gain adjusting control signal.

16. The signal demodulation method according to claim 15, wherein the gain adjusting controller comprising:
   a first switch, having a terminal connected to a terminal of a first current source, wherein the first switch receives the first digital signal and accordingly determines the first switch to be switched on or off;
   a second switch, having a terminal connected to another terminal of the first switch, and another terminal connected to a second current source, wherein the second switch receives the adjusted first digital signal and accordingly determines the second switch to be switched on or off; and
   a storing capacitor, having a terminal connected between the first switch and the second switch and outputting the gain adjusting control signal, and another terminal of the storing capacitor is connected to the ground voltage, wherein the gain adjusting control signal is a capacitor voltage of the storing capacitor.

17. The signal demodulation method according to claim 16, wherein when the first switch is switched on and the second switch is cut off, the first current source generates a charging current and proceeds charging to the storing capacitor through the first switch; when the first switch is cut off and the second switch is switched on, the second current source generates a discharging current and the discharging current flows from the storing capacitor to the second switch to allow the storing capacitor to proceed discharging; when the first switch is switched on while the second switch is cut off or shut down, the capacitor voltage of the storing capacitor stays the same.

18. The signal demodulation method according to claim 15, further comprising:
   an antenna, receiving a high frequency carrier signal, wherein the high frequency carrier signal includes a data of a recovery digital signal;
   a low noise amplifier, connected to the antenna, and the low noise amplifier receiving the high frequency carrier signal transmitted by the antenna, processes the high frequency carrier signal, and outputting a low-noise high frequency carrier signal; and
   a gain adjusting controller, connected to the low noise amplifier, and the voltage-controlled gain amplifier receiving the low-noise high frequency carrier signal and a gain adjusting control signal, and the voltage-controlled gain amplifier adjusting an amplitude of the low-noise high frequency carrier signal according to the gain adjusting control signal and outputting a digital modulation signal.

19. A receiver, comprising:
   a signal demodulation module according to claim 1, demodulating the digital modulation signal and outputting a recovery digital signal; and
   a load, receiving the recovery digital signal to proceed a normal work.

* * * * *